United States Patent [19]

Kinoshita et al.

[11] Patent Number: 6,014,351
[45] Date of Patent: Jan. 11, 2000

[54] CONTROLLING METHOD AND APPARATUS FOR INTEGRAL PERSONAL COMPUTER AND CD-PLAYER

[75] Inventors: Hidenori Kinoshita, Machida; Shuichi Iwata, Yokohama, both of Japan

[73] Assignee: International Business Machines Corporation, Armonk, N.Y.

[21] Appl. No.: 08/913,479

[22] PCT Filed: Dec. 29, 1995

[86] PCT No.: PCT/US95/17100

§ 371 Date: Dec. 18, 1997

§ 102(e) Date: Dec. 18, 1997

[87] PCT Pub. No.: WO96/28821

PCT Pub. Date: Sep. 19, 1996

[30] Foreign Application Priority Data

Mar. 14, 1995 [JP] Japan ..................................... 7-053879

[51] Int. Cl.[7] .................................................. G11B 17/22
[52] U.S. Cl. ............................................................ 369/33
[58] Field of Search .................................. 369/33, 32, 47, 369/48, 58

[56] References Cited

U.S. PATENT DOCUMENTS

| 4,811,314 | 3/1989 | Alves ........................................ 369/10 |
| 4,939,601 | 7/1990 | Endo et al. . |
| 5,467,329 | 11/1995 | Hashimoto ................................ 369/48 |
| 5,566,290 | 10/1996 | Silverbrook ............................. 395/173 |
| 5,644,505 | 7/1997 | Soutar et al. ............................. 381/58 |

FOREIGN PATENT DOCUMENTS

| 57-098150 | 6/1982 | Japan . |
| 60-55553 | 3/1985 | Japan . |
| 61-271660 | 12/1986 | Japan . |
| 63-187446 | 8/1988 | Japan . |
| 63-197047 | 8/1988 | Japan . |
| 3-168971 | 7/1991 | Japan . |
| 72-82527 | 10/1995 | Japan . |
| 2 234 105 | 1/1991 | United Kingdom . |

*Primary Examiner*—Tan Dinh
*Attorney, Agent, or Firm*—Michael N. Meller; Eugene Lieberstein

[57] ABSTRACT

A CD replay device, which includes an ejection button for controlling the ejection of a CD and which reads data on a surface of the CD. A disk ejection operation is performed when the ejection button has been depressed for a period of time that is less than a predetermined period. The replaying of a CD begins when the ejection button has been depressed for the predetermined period of time or longer.

14 Claims, 8 Drawing Sheets

FIG. 9

| OPERATIONAL MODE FOR CD-ROM DRIVE | EJECTION BUTTON DEPRESSION DURATION | NEXT OPERATION OF CD-ROM DRIVE |
|---|---|---|
| BEING HALTED | LESS THAN X SECONDS | EJECT |
| | X SECONDS OR LONGER | START REPLAY |
| BEING REPLAYED | LESS THAN X SECONDS | HALT REPLAY |
| | X SECONDS OR LONGER | HEAD SEEK-AND-SET PROCESS FOR NEXT MUSICAL PIECE |

TABLE 1

| PSEC | DISK TYPE |
|---|---|
| 00h | CD-DA TRACK OR CD-ROM TRACK |
| 10h | CD-I DISK |
| 20h | CD-ROM XA DISK |

TABLE 2

FIG. 10

| CONTROL | TRACK TYPES |
|---|---|
| 00x0<br>00x0<br>10x0<br>10x1 | CD-DA TRACK OR CD-GRAPHICS |
| 01x0<br>01x1<br>01x0<br>01x1 | CD-ROM TRACK |

TABLE 3

FIG. 11           X IS A REDUNDANT CODE

CONTROLLING METHOD AND APPARATUS FOR INTEGRAL PERSONAL COMPUTER AND CD-PLAYER

FIELD OF THE INVENTION

The present invention relates to a CD replay device that reads data that are recorded on the surface of a compact disk (CD), and a method for controlling such a device. More particularly, the present invention relates to a CD replay device that can be connected to a portable information processing apparatus, such as a notebook computer, and to a method for controlling such a device. The present invention also relates to a CD replay device that is incorporated in a notebook computer and that can easily play a music CD without interrupting an application that is being executed by a computer and to a method for controlling such a CD replay device.

BACKGROUND OF THE INVENTION

Compact, light personal computers (also called "portable computers" or "notebook computers") built from designs that take portability considerations into account are in wide use today. Also, as compact auxiliary storage devices have been produced, certain notebook computers are now available that can incorporate a CD-ROM drive (CD replay device) in addition to a hard disk drive (HDD) and a floppy disk drive (FDD). As an example, the ThinkPad 755CD (an IBM Corp. trademark), a notebook computer that is sold by IBM Japan Ltd. incorporates a CD-ROM drive.

FIG. 1 shows an outline illustration of a notebook computer 1. The notebook computer 1 in FIG. 1 is so designed that a lid 5, which has an internally mounted liquid crystal display panel (LCD) 4, is rotatably hinged with a main body 3, almost at the rear edge of the main body 3. In the main body 3, which has a keyboard 2, are a CPU, a main memory, a ROM, peripheral controllers, and a system board on which is a bus by which these components (none of them shown) are connected. A battery pack (not show:n), an HDD (not shown), and a CD-ROM drive 50 are incorporated in the lower space of the main body 3 beneath the keyboard 2. A disk tray for the CD-ROM drive 50 is slideably mounted under the main body 3 to facilitate the exchange of disks. On the front face of the disk tray 51, an ejection (Eject) button 6 is provided to control the ejection of the tray. At its rear, the CD-ROM drive 50 is attachably connected to the bus on the system board (not shown) and can be removed and replaced by another peripheral device, such as an FDD.

The recording on a CD, i.e., a compact disk (hereafter also referred to simply as a "disk"), is performed by forming pits (which have raised and depressed shapes that differ in reflectivity) that correspond to digital data on one face of a disk, which is formed of a transparent resin, and by overlaying an extremely thin metal film of, for example, aluminum and a further hard protective film. The CD-ROM drive (CD replay device) focuses a laser beam on a rotating disk, and employs the changes in the intensity of reflected light to read data. Since a great amount of data can be recorded on a CD at high density, a CD is employed for the recording not only of computer data but also of audio data, image data and various other data.

The physical and logical specifications for a CD were determined by a group of which Sony Corporation and Philips Ltd. were the central figures, and are described in a "Reads Book," a "Yellow Book,". and a "Green Book," to use the common titles.

A CD is so designed that data are recorded spirally from the center of the disk surface to the outside and in the same density. The physical format is classified roughly into three areas: from the center of the disk face, a lead-in area, a program area, and a lead-out area. The lead-in and the lead-out areas are employed for recording attribute information for a disk and various control information concerning, for example, start positions for the individual tracks.

The program area is employed for recording the substantial user data, such as computer data and audio data, and is constituted by a single or a plurality of tracks. A track can be divided into frames that are 24 bytes long. The length of a track is not constant and varies depending on the length of the user data that are recorded. In case of a music CD, for example, one track corresponds to one piece of music, and the track length corresponds to the playing period.

A track on which computer data are recorded is called a "CD-ROM track," and a track on which audio track are recorded is called a "CD-DA track". In addition, as one type of a CD-DA, there is a "CD-Graphics" where image data are recorded in an empty area within the audio data (more specifically a sub channel in a frame). As another type, there is a hybrid CD having mixed CD-ROM tracks and CD-DA tracks. Also, as other standards, there are "CD-I (Compact Disk-Interactive media), where image data and audio data are recorded on a single track with an interleave factor (time-sharing multiplexing of a plurality of channels), and a "CD-ROM XA."

CD-DA specifications are given in a "Red Book," CD-ROM specifications are given in a "Yellow Book," and CD-I specifications are given in a "Green Book." The CD-I specifications prescribe the standards for enabling dialogue operation, and the CD-ROM XA specifications prescribe the standards for the combining of audio data with animated data and for their joint handling as multimedia.

Generally, in the same way as with other peripheral devices, a CD-ROM drive that is incorporated in a computer receives, through a bus, a command that is issued in software, such as an application program or an operating system (OS), so that it is controlled by a computer system (hereafter referred to simply as a "system"). The CD-ROM that replays a music CD is no exception. The starting and stopping of a read, and the head seek and set process for the next recorded musical piece will be discussed in detail.

To perform the reading of a music CD by an incorporated CDROM drive, it is assumed that at least three kinds of programs should be loaded into a main memory of the system: an application program for the music CD operation (hereafter referred, to as a "CD-PLAYER.EXE"), a file manager driver that permits an OS to manage a CD-ROM as an external storage device (MSCDEX. EXE, etc. ), and a device driver for a CD-ROM drive "CD-PLAYER.EXE" must be executed when a read operation is to be performed with a music CD. Since multitasking is not available with DOS environment, for example, the following procedures are required to run a music CD during the execution of another application (DOS word processing).

1. DOS word processing is temporarily terminated. (If a document is being prepared, it must be saved and the job is terminated.)
2. A mouse program is activated if it has not yet been loaded.
3. CD-PLAYER.EXE is executed.
4. A pertinent selection (replay, halt, etc.) from a Graphical User Interface (GUI) screen menu is made by pointing and clicking with a mouse and the results of the operation are relayed to CD-PLAYER.EXE.
5. CD-PLAYER.EXE is terminated.
6. DOS word processing is resumed.

Similarly, the following procedures are required to run a music CD during the execution of another application (Windows application) on Windows.
1. The display for the Windows application that is being executed is minimized by a mouse operation, or a task is switched by depressing a toggle switch on a keyboard to provide a program manager window. 2. The icon of a program group wherein a CD-PLAYER icon is registered is opened.

3. The CD-PLAYER icon is double-clicked to activate CD-PLAYER.EXE and a desired menu selection is clicked in the CD-PLAYER window. By referring to the above explanation, it would be understood by one having ordinary skill in the art that, conventionally, playing a music CD on a computer presents the following difficulties.

(1) Interruption of an application that is being executed.

To control the starting or halting of replaying, a dedicated application, i.e., "CD PLAYER.EXE," must be activated every time. A bus is normally used to input data at a keyboard or with a mouse, and to transmit a command to a CD-ROM drive. Since an interrupt occurs at a CPU, an application that is being executed is inevitably suspended.

(2) Use of system resources.

For frequent playing of music CDs, an application for operating a music CD (e.g., CD-PLAYER.EXE) and specific drivers, such as a file manager driver (e.g., MSCDEX.EXE) and a device driver, have to be resident in main memory. Since a CD-PLAY2R. EXE program is generally from 70 to 200 kilobytes, and since each of the drivers is about 35 kilobytes, together, these programs constitute a considerably large load on the system resources.

(3) Operability.

To play a music CD during the execution of another application, the application must be temporarily terminated and CD-PLAYER.EXE must be activated (in the DOS environment), or windows must be switched and the CD-PLAYER icon must be selected and operated (in the Windows environment). Also, the initiating operation is comparatively complicated. Since the user interface differs for each application, this is another factor that contributes to the complication and the difficulty of the operation.

In such an environment, even when a computer user becomes tired because of the work being done (e.g., the preparation of a document by word processing) and decides to listen to music to relax, the operation to replay a music CD requires the interruption of an application or the above described input operations. This is troublesome for a user.

Further, there are some applications (e.g., CD-PLAYER-EXE) that do not permit "working while listening to music"; and even if the replaying of a music CD can be performed, it is terminated when such application is ended. Even when an application can be terminated and the original application (e.g., word processing) can be restarted while a music CD is being replayed, the application must be activated each time for a succeeding music CD operation (the head seek-and-set process for playing the next recorded musical piece, or the playing ' halt), and further manipulation and time are required. It is clear that if several tens to several hundreds of kilobytes in a main memory are always used merely for audio data processing, not for computer data processing, system resources are wasted. In other words, although a user has installed a CD replay device in a computer system, such user cannot easily be refreshed by listening to music whenever desired.

On the other hand, since dedicated CD replay devices for playing music CDs are equipped, as a standard, with special control buttons for individual operations, such as replay start, replay halt, and the head seek-and-set process for the next musical piece, a user can replay music CDs freely, any time desired. As for an incorporated CD-ROM drive, however, generally, only the front face of a disk discharge tray appears on the surface of the computer main body 1, as is shown in FIG. 1. On such a limited surface, at most only an ejection button 6 is provided, and the addition of other control buttons increases manufacturing costs. Therefore, the operation of an incorporated CD-ROM drive relies on input that is performed at a keyboard or with a mouse. Accordingly, the operation of the CD-ROM drive requires the use of the bus and the interruption of an application program that is being executed.

SUMMARY OF THE INVENTION

It is an object of the present invention to provide an excellent CD replay device that can be connected to a portable information processing apparatus, such as a notebook computer, and to a method for controlling such a CD replay device.

It is another object of the present invention to provide a CD replay device that is incorporated in a notebook computer and that can easily run a music CD without interrupting an application that is being executed on a computer system, and to a method for controlling such a CD replay device.

To achieve the above objects, according to a first aspect of the present invention, a CD replay device, which includes an ejection button that is used to control the ejection of a CD and which reads data on the surface of the CD, performs a disk ejection operation when the ejection button has been depressed for a period of time that is less than a predetermined period, and begins to replay a CD when the ejection button has been depressed for the predetermined period of time or longer.

According to a second aspect of the present invention, a CD replay device, which includes an ejection button that is used to control the ejection of a CD and which reads data on the surface of the CD, halts the replaying of the CD when the ejection button has been depressed for a period of time that is less than a predetermined time during the replaying of the CD, and begins to replay the next track on the CD when the ejection button is depressed for the predetermined time or longer during the replaying of the CD.

According to a third aspect of the present invention, a method, for controlling a CD replay device that includes an ejection button that is used to control the ejection of a CD and that reads data on the surface of the CD, comprises the steps of: ejecting the CD when the ejection button has been depressed for a period of time that is less than a predetermined period; and beginning the replaying of the CD when the ejection button has been depressed for the predetermined period of time or longer.

According to a fourth aspect of the present invention, a method, for controlling a CD display device that includes an ejection button that is used to control the ejection of a CD and that reads data on the surface of the CD, comprises the steps of: halting the replaying of the CD when the ejection button has been depressed for a period of time that is less than a predetermined time during the replaying of the CD; and beginning the replaying of the next track on the CD when the ejection button is depressed for the predetermined time or longer during the replaying of the CD.

According to a fifth aspect of the present invention, a method, for controlling a CD replay device that comprises a tray on which a CD is placed, a command mechanism for inserting and ejecting the tray, an ejection button to control the ejection of the tray, a read mechanism for seeking data on the surface of the CD and for reading the data, a data processor for processing the data that are read, a line out terminal for relaying an analog output of the data that are read, an interface for connecting the CD replay device to a bus of a computer system, and a controller for controlling all the operations, comprises the steps of: forcing the operations of the command mechanism when the ejection button is depressed for a period of time that is shorter than a predetermined time while the read mechanism is halted; beginning data reading by the read mechanism when the ejection button is depressed for the predetermined time or longer while the read mechanism is halted; and outputting the data that are read from the line out terminal.

According to a sixth aspect of the present invention, a method, for controlling a CD replay device that comprises a tray on which a CD is placed, a command mechanism for inserting and ejecting the tray, an ejection button to control the ejection of the tray, a read mechanism for seeking data on the surface of the CD and for reading the data, a data processor for processing the data that are read, a line out terminal for relaying an analog output of the data that are read, an interface for connecting the CD replay device to a bus of a computer system, and a controller for controlling all the operations, comprises the steps of: halting data reading by the read mechanism when the ejection button is depressed for a period of time that is shorter than a predetermined time during the data reading by the read mechanism; and skipping from a reading position on the CD to a succeeding track when the ejection button is depressed for the predetermined time or longer during the data reading by the read mechanism.

According to a seventh aspect of the present: invention, a method, for controlling a CD replay device that comprises a tray on which a CD is placed, a command mechanism for inserting and ejecting the tray, an ejection button to control the ejection of the tray, a read mechanism for seeking data on the surface of the CD and for reading the data, a data processor for processing the data that are read, a line out terminal for relaying an analog output of the data that are read, an interface for connecting the CD replay device to a bus of a computer system, and a controller for controlling all the operations, wherein data are read from a CD-DA track and an analog output of the data can be transmitted from the line out terminal, comprises: a timing step of timing a period during which the ejection button is depressed; a first decision step of determining whether or not a CD-DA track is being read when, at the timing step, the period is a predetermined period or longer; a second decision step of determining whether or not a CD has been placed on the tray when, at the first decision step, no reading of the CD-DA track is being performed; a third decision step of determining whether or not a possibility exists that a CD-DA track is included on the CD when, at the second decision step, the CD is determined to be placed; a seeking step of seeking the next CD-DA track when, at the third decision step, a possibility exists that the CD-DA track is included on the CD; and a playing step of reading data from the CD-DA track that is found at the seeking step and of providing at the line out terminal an analog output of the data that is read.

In the seventh aspect, when, at the playing step, the data reading from the CD-DA track has been completed, the following CD-DA track may be sought on the CD and the replaying step may be repeated.

Further, in the seventh aspect, so long as the result obtained by either one of the second and the third decision steps is negative, the tray may be ejected by the command mechanism.

In addition, in the seventh aspect, when, at the first decision step, data are being read from the CD-DA track, the following CD-DA track on the CD may be sought and data may be read from that CD-DA track.

Moreover, in the seventh aspect, when a period during which the ejection button is depressed is less than a predetermined time at the timing step, a check may be performed to determine whether or not data are being read from a CD-DA track, and when data are being read, the data reading may be halted. On the contrary, when data reading is not being performed, the tray may be ejected by the command mechanism.

According to the present invention, when an ejection button is depressed during the halting or the replaying, the CD-ROM drive performs the operations that are shown in the Table of FIG. 9.

As is apparent from FIG. 9, a CD-ROM drive according to the present invention can employ a single ejection button to instruct all of the operations, such as the start of the replaying for a music CD, the halting of its replaying, the heal seek-and-set process for a succeeding musical piece, and the ejection of the CD. "X seconds" in the Table of FIG. 9 is determined by using a default value that is given in advance or by the firmware setup within n the CD-ROM drive. The value of X may be dynamically reset by using a jumper switch or by entering a system command. In article D-2 of the embodiments below, x=2 [sec.].

An ejection button is one of the standard features of an incorporated type CD-ROM drive, as is shown in FIG. 1, and thus does not increase the manufacturing costs. Since the operations that are shown in FIG. 9 can be performed by firmware within the CD-ROM drive, they have no effect at all on the design of a notebook computer system.

According to the present invention, when a user needs to take a break by listening to music while working (e.g., preparing a document by word processing), the user can realize such a desire simply by depressing an ejection button.

The basic operations, such as the start of replaying for a music CD, the halting of the replaying, and the head seek-and-set process for the succeeding musical piece, can be performed without involving any computer system control functions. The computer system does not have to terminate the application that is being executed. Therefore, no special effort nor time need be expended by a user to play a music CD, and "working while listening to music" is a concept that can be easily realized, depending on the mood of the moment.

In addition, an application (CD-PLAYER.EXE) for the operation of a music CD does not have to be loaded into the main memory of the computer system. Further, it is not necessary for MSCDEX.EXE and a device driver for a CD-ROM drive to be resident in the main memory simply for the replaying of a music CD. Therefore, the present invention saves on the system resource requirements.

Other objects, features, and advantages of the present invention will become obvious from the detailed description of the following embodiment that is given while referring to the accompanying drawings.

BRIEF DESCRIPTION OF THE DRAWINGS

FIG. 4b is schematic diagram showing the physical format of a CD such as that shown in FIG. 4a;

FIG. 9 is a table of the operations performed when the ejection button is depressed;

FIG. 10 is a table showing the relationship between PSec Field values and compact disk types; and FIG. 11 is a table showing the relationship between the Control field values and disk track types.

DESCRIPTION OF THE PREFERRED EMBODIMENTS

Figure 1:
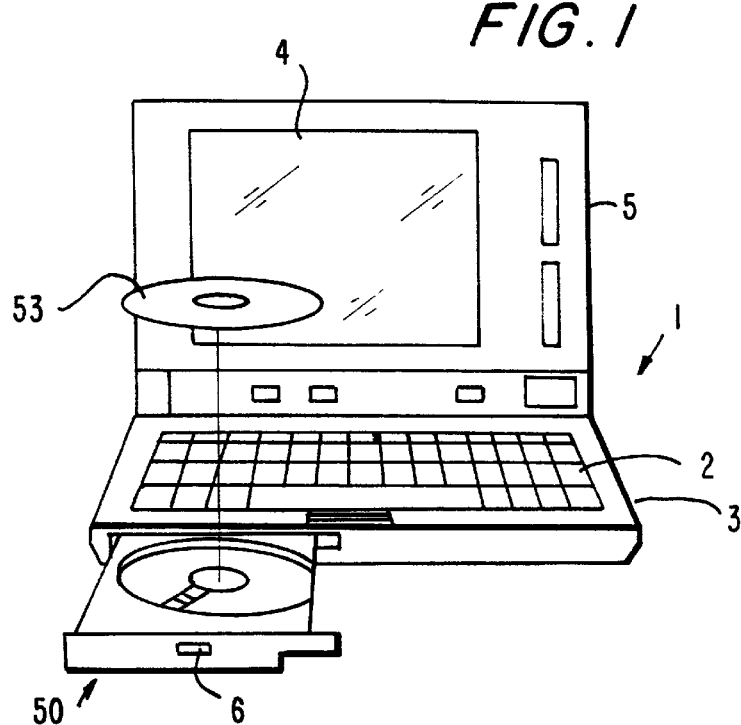
FIG. 1 is an outline view of a notebook computer having a built-in CD-ROM player.

Referring to the drawings, the description of the embodiment of the present invention will be divided into the following articles for convenience
A. Hardware arrangement of a computer
B. Hardware arrangement of a CD-ROM drive
C. Data structure of a compact disk
D. Operation of a CD-ROM drive
E. Appendix
A. Hardware Arrangement of a Computer FIG. 2 is a schematic diagram illustrating the hardware arrangement of a notebook computer 1 that is employed to carry out the present invention.

Figure 2:
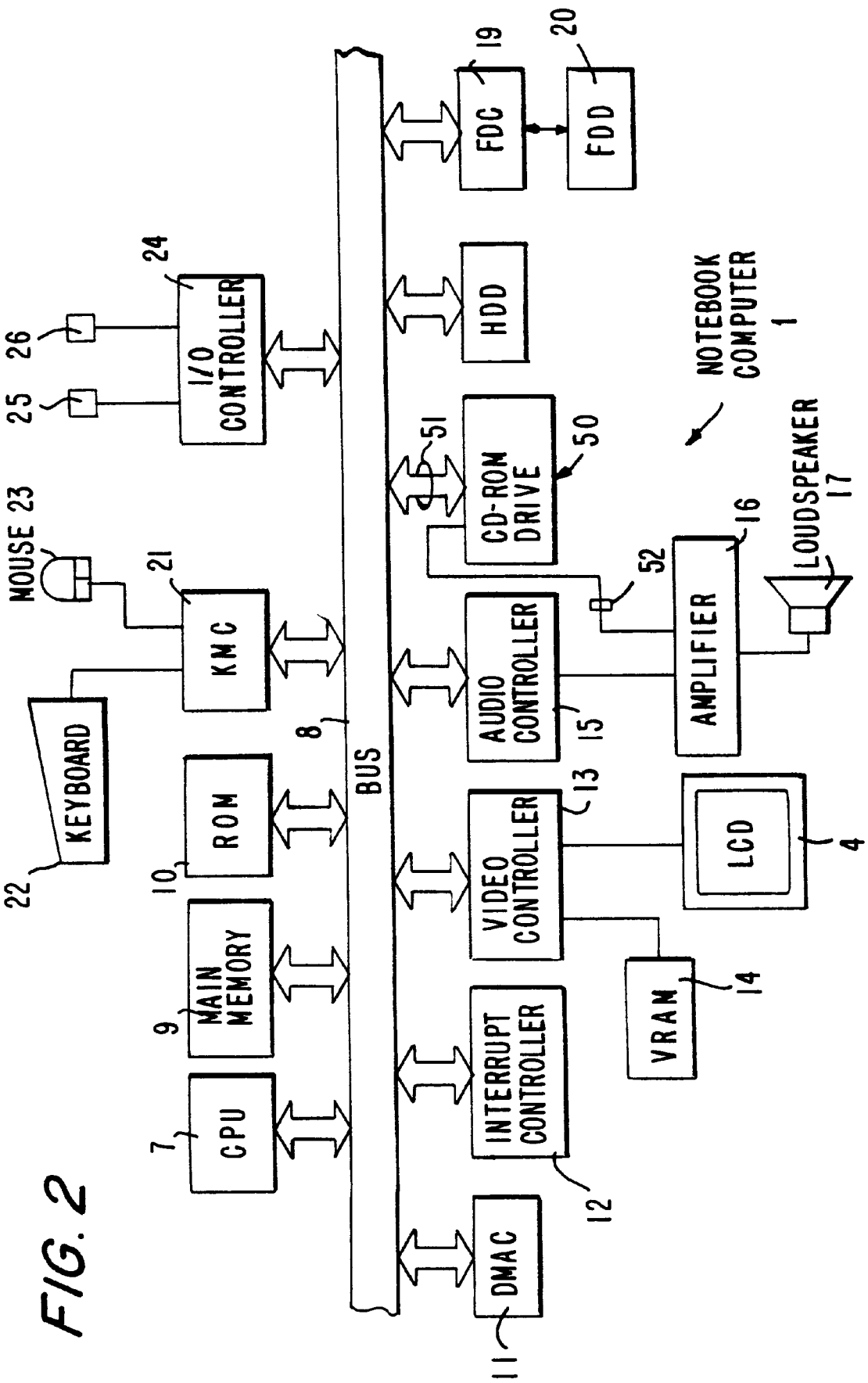
FIG. 2 is a schematic diagram of the hardware arrangement of a preferred embodiment of the present invention.

In FIG. 2 a Central Processing Unit (CPU) 7 executes an application program under the control of an operating system (OS). The CPU 7 communicates with the individual sections by means of a transfer path (bus) 8 for the transmission of address signals such as address signals, data signals, and control signals. The individual components will now be explained.

A main memory 9 is a volatile memory, Random Access Memory (RAM), into which the individual programs are loaded and that serves as a work area for the CPU 7. A Read Only Memory (ROM) 10 is a non-volatile memory in which a POST (Power On Self Test) program and a BIOS (Basic Input/Output System) for hardware control are encoded and permanently stored.

A Direct Memory Access Controller (DMAC) 11 is a special processor by which data are transferred between the main memory 9 and peripheral devices without passing through the CPU 7.

An interrupt controller 12 is a processor that monitors the bus 8 and reports to the CPU 7 any occurrence of interrupt on the bus 8. A video controller 13 is a processor that processes a video command from the CPU 7. A VRAM 14 is a processor that temporarily stores video data that are being processed. An LCD 4 is a device that displays the contents of the VRAM 14.

An audio controller 15 is a processor that handles the input and the output of audio signals. An audio signal is amplified by an amplifier 16 and the amplified signal is output through a loudspeaker 17. The amplifier 16 receives an analog signal also from a CD-ROM drive 50 via a signal line 52 (which will be described later).

An HDD 18 and an FDD 20 are auxiliary storage devices. An FDC 19 is a controller that drives the FDD 20.

In addition to the HDD 18 and the FDD 20, the notebook computer 1 includes a CD-ROM drive 50 as an auxiliary storage device. The CD-ROM drive 50 is connected via the bus 8 to a bus connector 51 for the exchange of commands and of digital data, and outputs analog data directly to the amplifier 16 via the signal line 52 (the details will be explained in article B).

An I/O controller 24 is a controller that enables, data exchange with a modem or a printer (not shown) via a serial port 25 and a parallel port 26.

The computer 1 includes a keyboard 22 and a mouse 23 with which a user inputs data and commands. An input matrix from the keyboard 22 and pointed coordinates from the mouse 23 are processed by a keyboard/mouse controller (KMC) 21.

The components in the hardware arrangement of the computer 1 that are described in this article are well known to one having ordinary skill in the art. Besides these components in FIG. 2, there are various other hardware components (controllers, interface circuits, peripheral devices, etc.) that constitute a notebook computer. It would be understood for one having ordinary skill in the art that to simplify the explanation some components are not shown in this specification.

Figure 3:
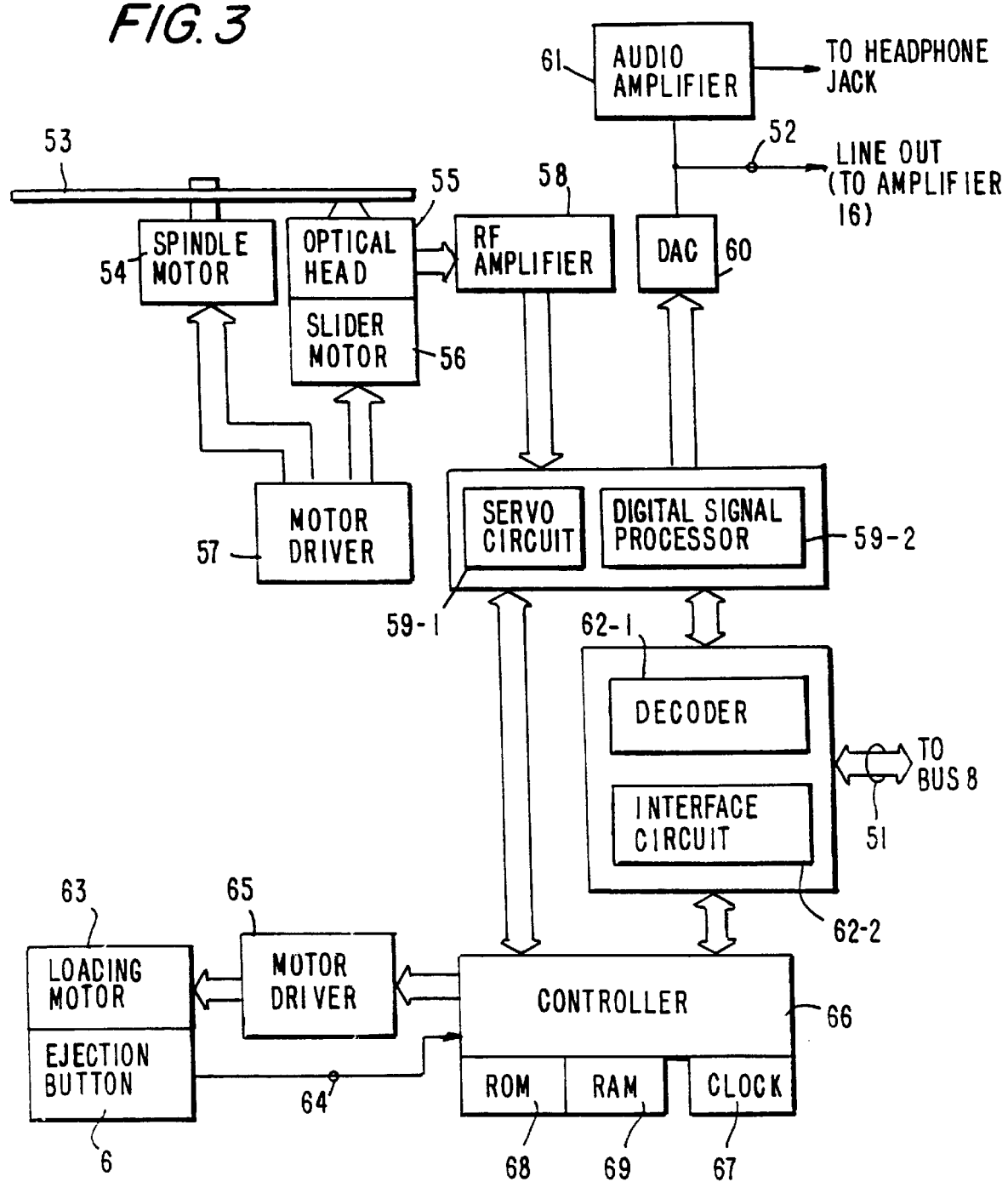
FIG. 3 is a schematic diagram of the hardware arrangement of a CD-ROM player used with the embodiment of FIG. 2.

B. Hardware Arrangement of a CD-ROM Drive FIG. 3 shows the hardware arrangement of the incorporated CD-ROM drive 50 that is employed to carry out the principles of the present invention. The individual components of the CD-ROM drive 50 will be explained.

A compact disk (CD) 53, which is a recording medium, is rotatably mounted on a spindle motor 54. An optical head (Pick-Up-Head) 55 is located under the lower surface of the disk 53. To read data, the optical head 55, which transmits a laser beam to the disk 53 and receives its reflected beam, is mounted on a slider motor 56 that can be shifted in a direction of the radius of the disk 53. A motor driver 57 controls the or spindle motor 54 and the slider motor 56 so as to rotate the tracks of the disk 53 at constant linear velocity (CLV) relative to the optical head 55.

A signal that is outputted by the optical head 55 is transmitted to an RF amplifier 58 to control the position of the optical head 55 and to read data from the disk 53. For the position control, a closed loop control system, which includes a servo circuit 59-1 and the motor driver 57, synchronously drives the spindle motor 54 and the slider motor 56 in response to the output signal from the optical head 55. This permits access by the optical head 55 to a predetermined position on the disk 53. The optical head 55 is supported by a double-axis device (not shown) that can be shifted slightly, and thus focusing correction and tracking correction are permitted.

FIG. 3 shows the hardware arrangement of the incorporated CD-ROM drive 50 that is employed to carry out the principles of the present invention. The individual components of the CD-ROM drive 50 will be explained.

A compact disk (CD) 53, which is a recording medium, is rotatably mounted on a spindle motor 54. An optical head (Pick-Up-Head) 55 is located under the lower surface of the disk 53. To read data, the optical head 55, which transmits a laser beam to the disk 53 and receives its reflected beam, is mounted on a slider motor 56 that can be shifted in a direction of the radius of the disk 53. A motor driver 57 controls the or spindle motor 54 a:nd the slider motor 56 so as to rotate the tracks of the disk 53 at constant linear velocity (CLV) relative to the optical head 55.

A signal that is outputted by the optical head 55 is transmitted to an RF amplifier 58 to control the position of the optical head 55 and to read data from the disk 53. For the position control, a closed loop control system, which includes a servo circuit 59-1 and the motor driver 57, synchronously drives the spindle motor 54 and the slider motor 56 in response to the output signal from the optical head 55. This permits access by the optical head 55 to a predetermined position on the disk 53. The optical head 55 is supported by a double-axis device (not shown) that can be shifted slightly, and thus focusing correction and tracking correction are permitted.

For the reading of data on the disk 53, a signal that is output from the optical head 55 is processed by a digital signal processor (DSPI) 59-2 and the resulting signal is converted into an analog signal by a digital-analog converter (DAC) 60. The analog signal is amplified by an audio amplifier 61, and the amplified signal is outputted either through a headphone jack (not shown) of the CD-ROM drive 50, or from the line out terminal to the amplifier 16 of the computer 1 via the signal line 52. To output the read-out data as digital data, the data are decoded by a decoder 62-1 and the decoded data are then transmitted to the bus 8 of the computer I via the bus connector 51. In this embodiment, the servo circuit 59-1 and the digital signal processor 59-2 are constructed as a single chip.

A tray (see FIG. 1), on which the disk 53 is placed so as to be exchangeable is coupled to a loading motor 63, so that the tray can be inserted and ejected. An ejection button 6 is a control button that is provided on the front face of the CD-ROM drive 50 (see FIG. 1) to control operations, such as the insertion/ejection of the tray. When the ejection button 6 is depressed, it sends a signal via a signal line 64 to a controller or command mechanism 66. The motor driver 65 thereafter drives the loading motor 63 in response to a control signal received from the controller 66.

The controller 66 controls the individual sections in the CD-ROM drive 50. More specifically, the controller or command mechanism 66 performs a predetermined process on a signal that is received from the ejection button 6 via the signal line 64. It controls the operations of the CD-ROM drive 50, such as the reading of data from the surface of the disk 53 and the halting of the reading. It controls the insertion and ejection of the tray (the details will be described in article D-2). In addition, the controller 66 includes a clock 67 for counting operational timing, a ROM 68, and a RAM 69.

The ROM 68 is a read only memory for permanently storing data and is employed for recording various firmware. The firmware includes, for example, (A) code for a self-test that the drive 50 performs when powered on, (B) code for the interpretation of a command that is received from the computer 1 via the bus 8, (c) code for the confirmation of the state of the drive 50, such as disk in/out or tray in/out, and (d) code for the mechanical control in the drive 50. A program that accomplishes the operation that will be described in article D and a software timer that measures the period that the ejection button 6 is depressed are included in the firmware in the ROM 68.

The RAM 69 is a writable memory that is employed as a work area for the controller 66. In the RAM 69 is stored a variety of information about a disk that is currently loaded (e.g., file allocation information such as TOC (which will be described later)), a drive parameter that indicates a data transfer speed, and an audio parameter that indicates a sound output level.

An interface circuit 62-2, which permits the exchange of digital data by the bus 8 of the computer 1 and the CD-ROM drive 50, is connected to the bus 8 via the bus connector 5:1. As for the standards for an interface that connects the CD-ROM 50 to the bus 8 of the personal computer 1, although in addition to the SCSI and Enhanced IDE standards there are others that have been specified by individual makers, no limitations are imposed on interface standards for the realization of the present invention.

SCSI is an abbreviation of Small Computer System Interface, and the standards for peripheral interfaces, for a compact computer, which are standardized by the American National Standards Institute (ANSI). IDE is an abbreviation of Integrated Drive Electronics, and is one of the interfaces that are used to directly connect a hard disk to an ISA bus. Enhanced IDE is an enhanced version for a CD-ROM drive.

In this embodiment, the decoder 62-1 and the interface circuit 62-2 are constituted as a single chip.

The hardware arrangement of- the CD-ROM drive 50 explained in this article (except for the firmware in the ROM 68 that is used for specific operations that will be explained in article D) is well known to one having ordinary skill in the art. Although the CD-ROM drive 50 includes hardware components other than those shown in FIG. 3, those components are well known and to simplify the description no explanation are given for them in this specification.

It should be noted that when audio data in an arbitrarily CD-DA track on the disk 53 are read and converted into an analog signal by the DA converter 60, and the converted analog signal is output from the line out terminal 52 to the amplifier 16 of the computer 1, or is amplified by the audio amplifier 61 and the amplified signal is output to a headphone, the replaying of a music CD can be performed. While replaying a music CD,, the CD-ROM drive 50 does not require any exchange of commands and data via the bus connector 51, i.e., does not use the bus 8 of the computer 1 at all.

C. Data Structure of a Compact Disk

Figure 4A:
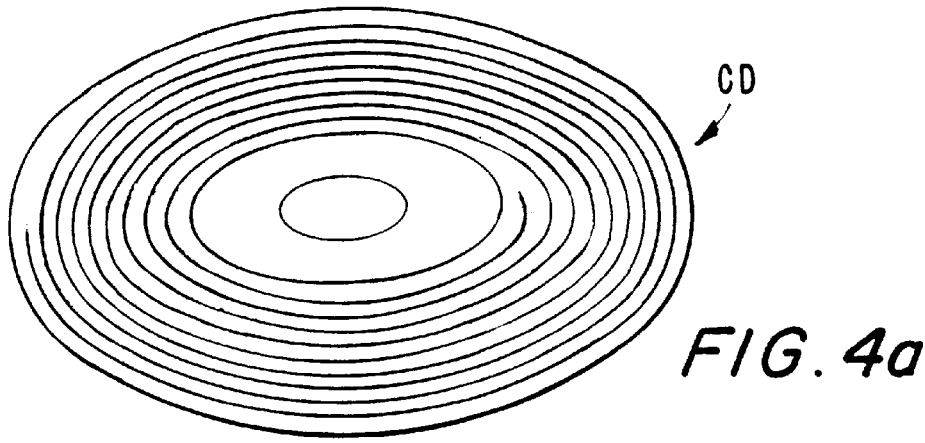
FIG. 4a is a perspective plan view of a surface of a compact disk (CD)
Figure 4B:
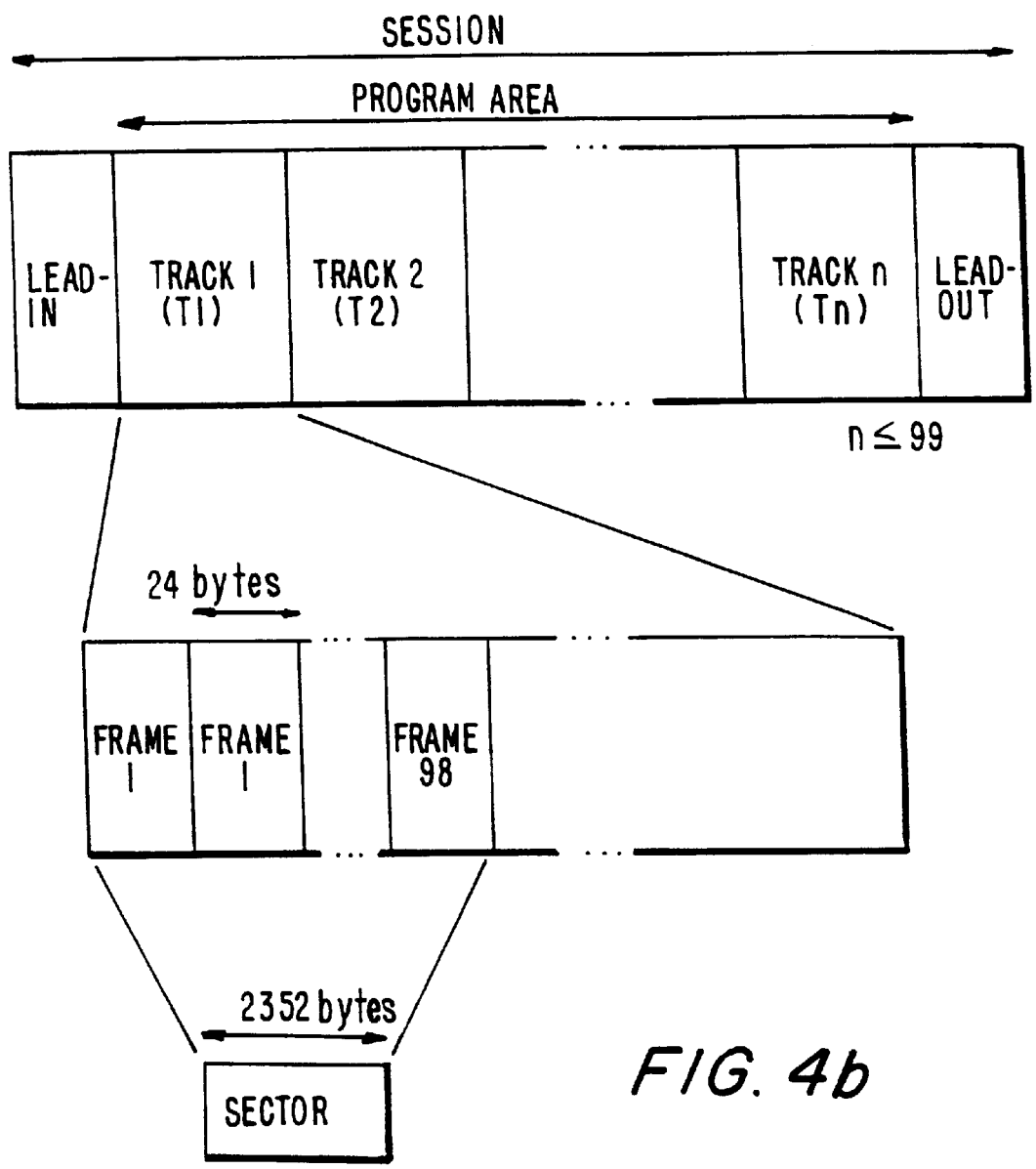

An explanation has been given in "Background of the Invention" that data are recorded spirally on the disk surface with the same density, and spiraling from the center, the data area is divided into a lead-in area, a program area, and a lead-out area (see FIG. 4). In this article, to simplify the explanation in article D, the physical format of a CD will be explained in more detail.

FIG. 4(*b*) is a schematic diagram showing a physical format of a CD. One session is so formed that a program area that is substantially user data is sandwiched between a lead-in area and a lead-out area. Although a CD normally carries only one session (single-session), a "Photo CD" on which photograph images are recorded is a multi-loading type that carries a plurality of sessions (multi-session). Since the Photo CD does not include audio data (CD-DA tracks), it can not be used with this embodiment of the present invention.

A maximum of 99 tracks can be stored in the program area. One CD-DA track corresponds to one piece of music and the number of tracks in a disk that is dedicated to music corresponds to the number of musical pieces. One track can be further divided into frames. A frame is the minimum unit for data processing, and consists of 24 bytes. A group of 98 sequential frames (2352 byte length) is called a sector. The length of a track is not constant. In the case of a CDDA track, the number of sectors that is included in one track is determined according to the playing period for a music piece.

Figure 5A:
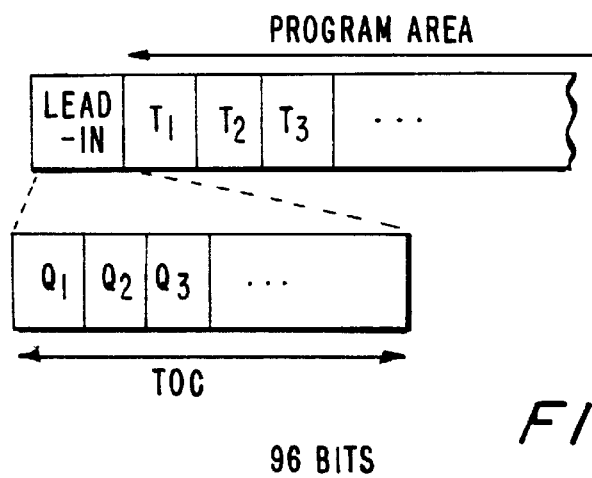
FIG. 5a is a schematic diagram of the program area and the Table of Contents (TOC) arranged on a CD.
Figure 5B:
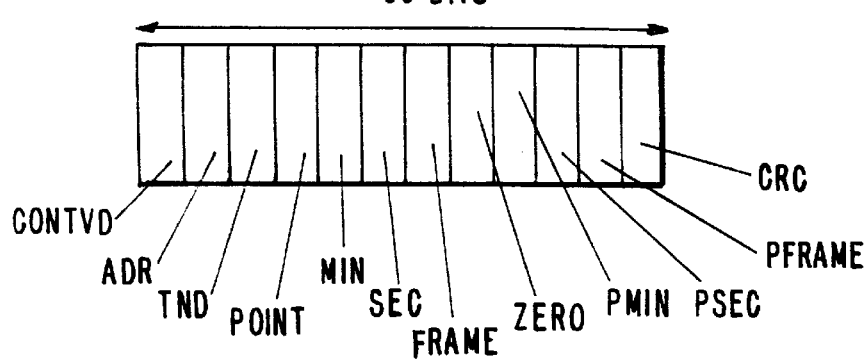
FIG. 5b is a schematic diagram of the field structure of one of the channels arranged on a CD.

Various control information, such as attribute information and start positions of tracks, are recorded in the lead-in area and the lead-out area. In the lead-in area is stored a table, a so-called TOC (Table Of Contents), for managing attribute information and control information on the disk by track units. As is shown in FIG. 5(a), in the TOC, one record that consists of 96 bits, a so-called "Q channel," is prepared for each track, and the Q channels are stored in the order of the tracks in the program area. The data structure of a Q channel conforms to a field structure (called a "Q format") that is shown in FIG. 5(b), and data for the tracks are stored in the corresponding fields.

Values that are stored in the individual fields (Control, ADR, in the Q channel are employed during a track seek on the CD or when the data in the track are read. Especially, the control field value and the PSec field value are employed for the operation of the CD-ROM drive 50, which will be described in the succeeding article D, and will therefore be but briefly explained below.

The PSec field is employed to represent a disk type. The Table of FIG. 10 shows the relationship between PSec Field values and disk types. According to FIG. 10, when PSec= 00h, the disk consists of CD-DA tracks (including CD-Graphics), CD-ROM tracks, or hybrid CD-DA tracks and CD-ROM tracks. In other words, when PSec=00h, the disk may include audio data (CD-DA tracks). When PSec= 10h, the disk is a CD-I type, and when PSec =20h, the disk is a CD-ROM XA type. Therefore, with any value other than PSec=00h, the disk does not include audio data in a CD-DA format (i.e., in a format that is not interleaved).

Generally, tracks with different PSec values do not coexist on a single disk. Whether or not a disk includes a CD-DA track can be determined by referring to one PSec value of an arbitrary single Q channel in the TOC.

The control field is employed to represent a corresponding track type. The Table of FIG. 11 shows the relationship between the Control field values and track types. According to FIG. 11, when the second bit from the top is "0," its corresponding track is a CD-DA or CD-Graphics type. When that bit is "1," its corresponding track is a CD-ROM type. In this manner, whether or not a corresponding track is a CD-DA type (audio data) can be determined by referring to the second bit from the top in the Control field in the Q channel.

The physical format for a CD that is shown in FIGS. 4 and 5 is a well known format that was determined by Sony Corporation and Philips Ltd.

D. Operation of a CD-ROM Drive

The hardware arrangement and the other arrangement that practices the principles of the present invention have been explained in articles A through C. In article D, the operation of the CD-ROM 50 that employs these arrangements will be explained. The operation of the CD-ROM 50 can be performed by the firmware in the ROM 68 (FIG. 3).

D-1. Operation when a Compact Disk is Exchanged

The operation when a compact disk in the CD-RON drive 50 is exchanged will be explained in this article while referring to the flowchart in FIG. 6.

Following the insertion of the tray of the CD-ROM 50 at step S10, at step S12, a check is performed to determine whether or not a disk exists on the tray. The presence of the disk can be easily determined by detecting the amount of light that the optical head 55 has received.

If the decision at step S12 is affirmative, at step S14, a Disk-in flag that indicates the presence of a disk is set at predetermined address#bbbb in the RAM 69, and program control advances to step S16. If the decision at step S12 is negative, program control branches to No and returns to the initial step.

At step S16, a check is performed to determine whether or not access of the loaded disk is possible. This check is required because sometimes data can not be read out due to a dirty disk surface or a scratched disk surface. When the decision at step S16 is affirmative, at step S18, a Validity flag, indicating that access of the disk has been validated, is set at predetermined address #cccc in the RAM 69. Program control then advances to step S20. When the decision at step S16 is negative, the further process steps for accepting the disk is not performed and the processing is terminated in failure (ABORT).

At step S20, the TOC is read out by accessing the lead-in area, which is located inward on the disk, and is stored at predetermined address #aaaa and its following address in the RAM 69.

Figure 6:
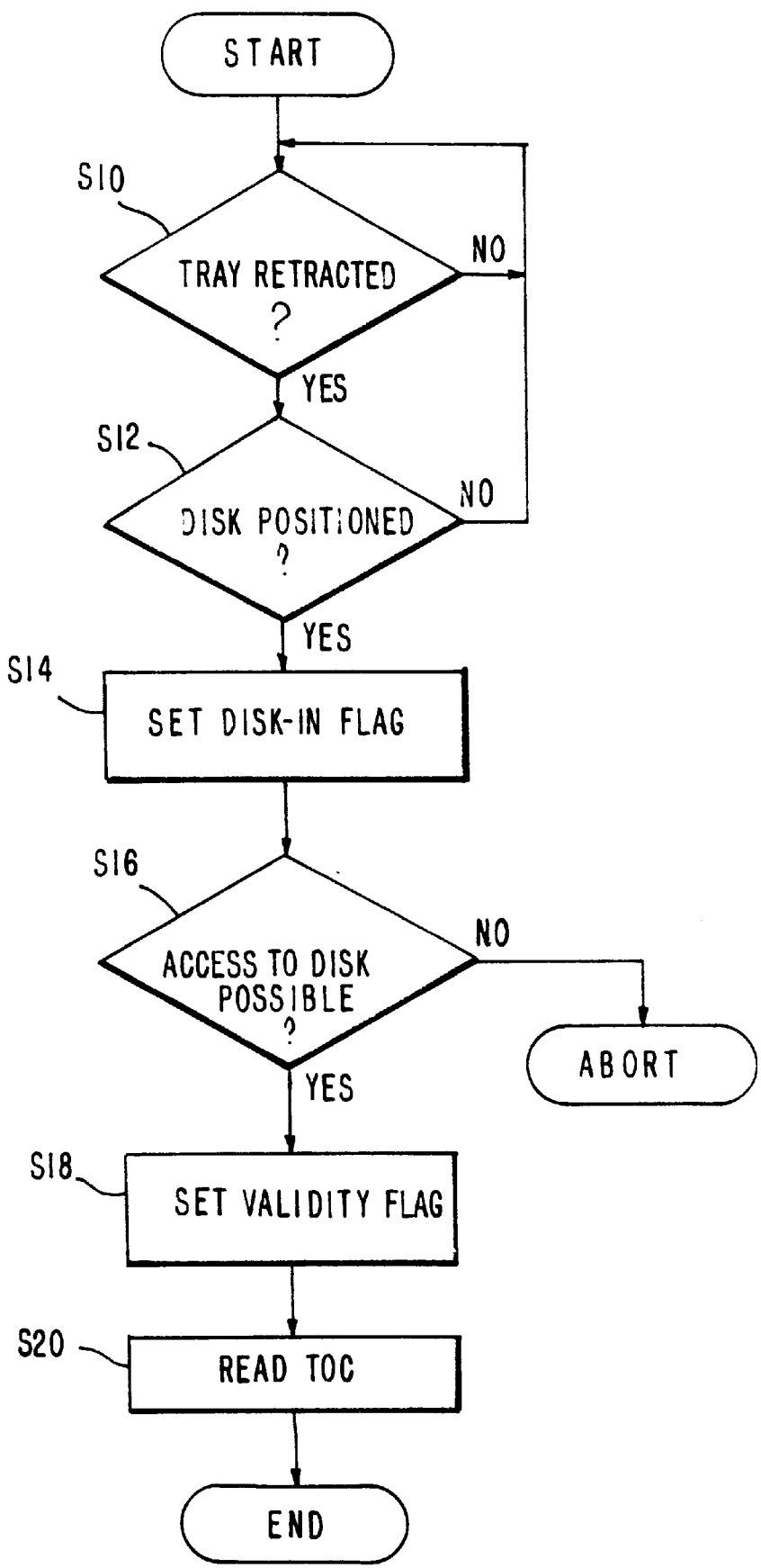
FIG. 6 is a flowchart of the operation when a disk in the CD-ROM drive is replaced.
Figure 7:
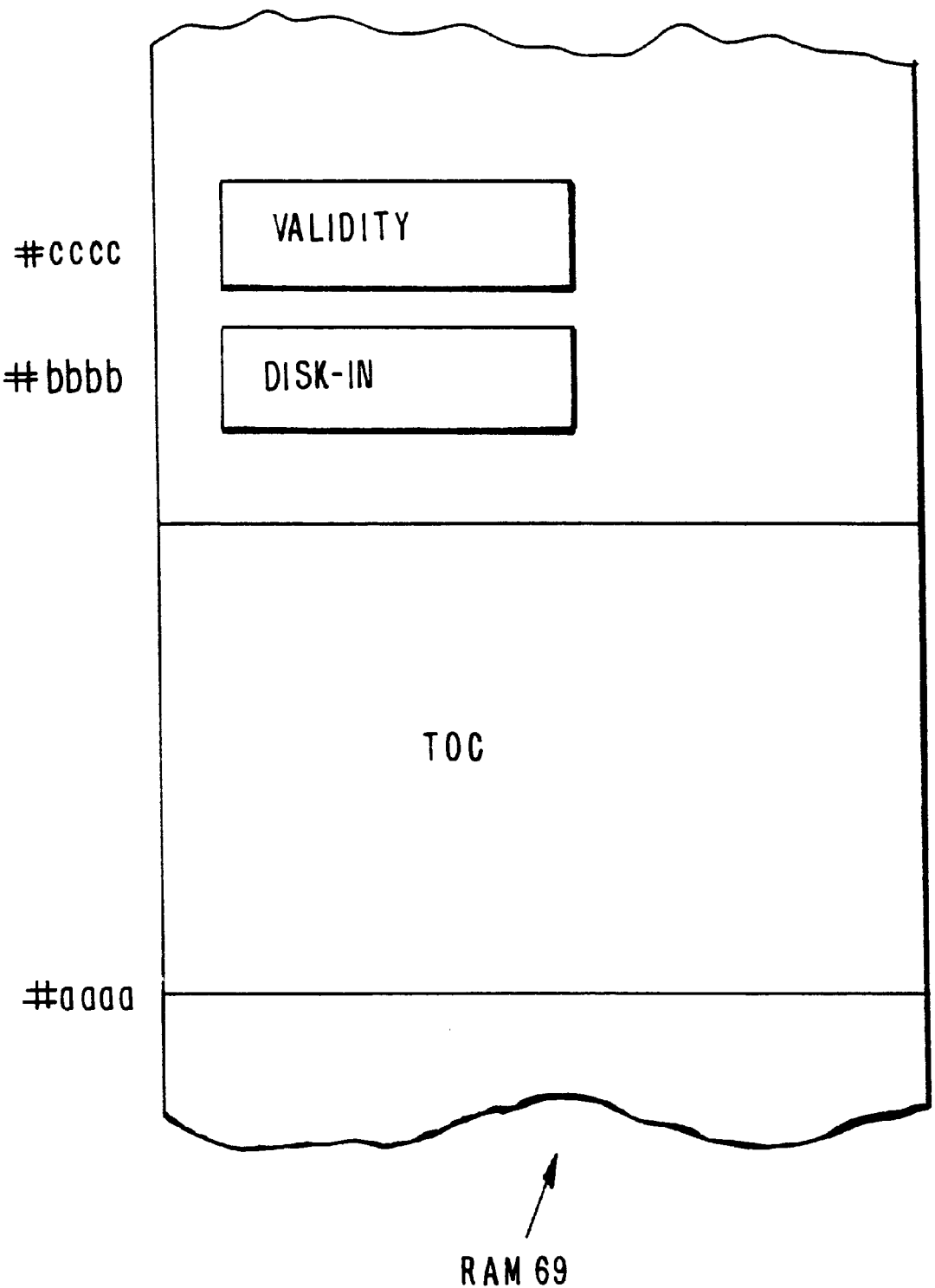
FIG. 7 is a schematic diagram of the recorded contents of the Random Access Memory (RAM) after the processing of the flowchart of FIG. 6 is completed.

FIG. 7 is a specific diagram showing the recorded contents in the RAM 69 after the processing in tile flowchart in FIG. 6 is terminated successfully. The controller 66 does not use, as work areas, the areas in the RAM 69 where the TOC and these flags are stored. The stored TOC and flags are saved until the next replacement of the disk (or the ejection of the tray).

The operation shown in FIG. 6 is a normal disk replacement operation that is performed in almost all current CD-ROM drives, regardless of whether or not the present invention is employed. It should be noted that to store the TOC of a loaded disk at a predetermined address in the RAM 69 and to set a Disc-in flag and a Validity flag (or data equivalent to these flags) are requirements for performing an operation in the succeeding article D-2.

D-2. Operation when an Ejection Button is depressed The operation performed when an ejection button of the CDROM drive 50 is depressed will now be described while referring to the flowchart in FIG. 8.

When the ejection button 6 of the CD-ROM drive 50 is depressed at step S30, a depression time T is counted at step S32. The counting of the time T is performed by the software timer (previously described) of the ROM 68. When T is two seconds or longer, program control branches to Yes and advances to step S34. When T is shorter than two seconds, program control branches to No and moves to step S52. In this embodiment, a period of two seconds is predetermined by the firmware in the ROM 68, but may be dynamically altered by a jumper switch or a system command.

At step S34, a check is performed to determine whether or not a CD-DA track on a disk is being replayed.

When the decision at step S34 is negative, the depression for two seconds or longer at step S30 is regarded as a request for the "replaying of a music CD." Program control then branches to No and moves to step S36, and a check is performed to determine whether or not an accessible disk is positioned on the tray. The determination is made by examining whether or not the Disk-in flag and the Validity flag have been set at the respective addresses#bbbb and #cccc in the RAM 69.

At step S38, a check is performed to determine whether or not there is a possibility that audio data (a CD-DA track) exists on the loaded disk. The determination is made by accessing the TOC, which is stored at a predetermined address following address #aaaa in the RAM 69, and by referring to a value in the PSec field of an arbitrary Q channel. When PSec=00h, the decision at step S38 is affirmative. When PSec has another value, the result at step S38 is negative.

When the result at one of steps S36 and S38 is negative, the depression of the ejection button 6 at step S30 is regarded as a request for "tray ejection." Program control thus advances to step S50 ([Eject]) where the tray is ejected. When the results at both steps S36 and S38 are affirmative, at step S40, one of the Q channels is read from the head of the TOC that is stored in the RAM 69. Then, at step S42, by referring to the second bit: from the top of the Control field value in the Q channel, a check is performed to determine whether or not a corresponding track is a CD-DA track.

If the decision at step S42 is affirmative, program control advances to step S44 ([PLAY]) where that track is played (i.e., the music CD is played). When the playing of the track has been completed, program control advances to step S46, where a seek is performed for the next track. If the decision at step S42 is negative (that is, the track is not a CD-DA track), the track playing at step S44 is skipped and a seek is performed for the next track at step S46. When, at step S48, the next track is found as the result of the seek procedure at step S46, program control branches to Yes and returns to step S40. The same process is repeated. By the performance of such loop processing, CD-DA tracks on the disk are sequentially found and music is played. When, at step S48, no next track is found, all the CD-DA tracks on the disk have been played. Program control thus branches to No and moves to step S54 ([STOP]).

When, at step S34, the playing of a CD-DA track on the disk has begun, the depression of the ejection button 6 for two seconds or longer that was performed at step S30 is regarded as a request for a "head seek-and-set process for the next musical piece." Program control then branches to Yes and goes to step S46, where a seek is performed for the next track and the same process as is described above is performed.

If, at step S32, the depression time for the ejection button 6 is less than two seconds, program control branches to No and goes to step S52. At step S52, a check is performed to determine whether or not the CD-DA track on the disk is being played. When playing has begun, the depression of the ejection button 6 is regarded as a request for "halting the playing of a music CD." Program control branches to Yes and goes to step S54 ([STOP]). When the playing of the CD-DA track is not being performed, the depression of the ejection button 6 is regarded as a request for a "tray ejection." Program control branches to No and moves to step S50 ([EJECT]).

Figure 8:
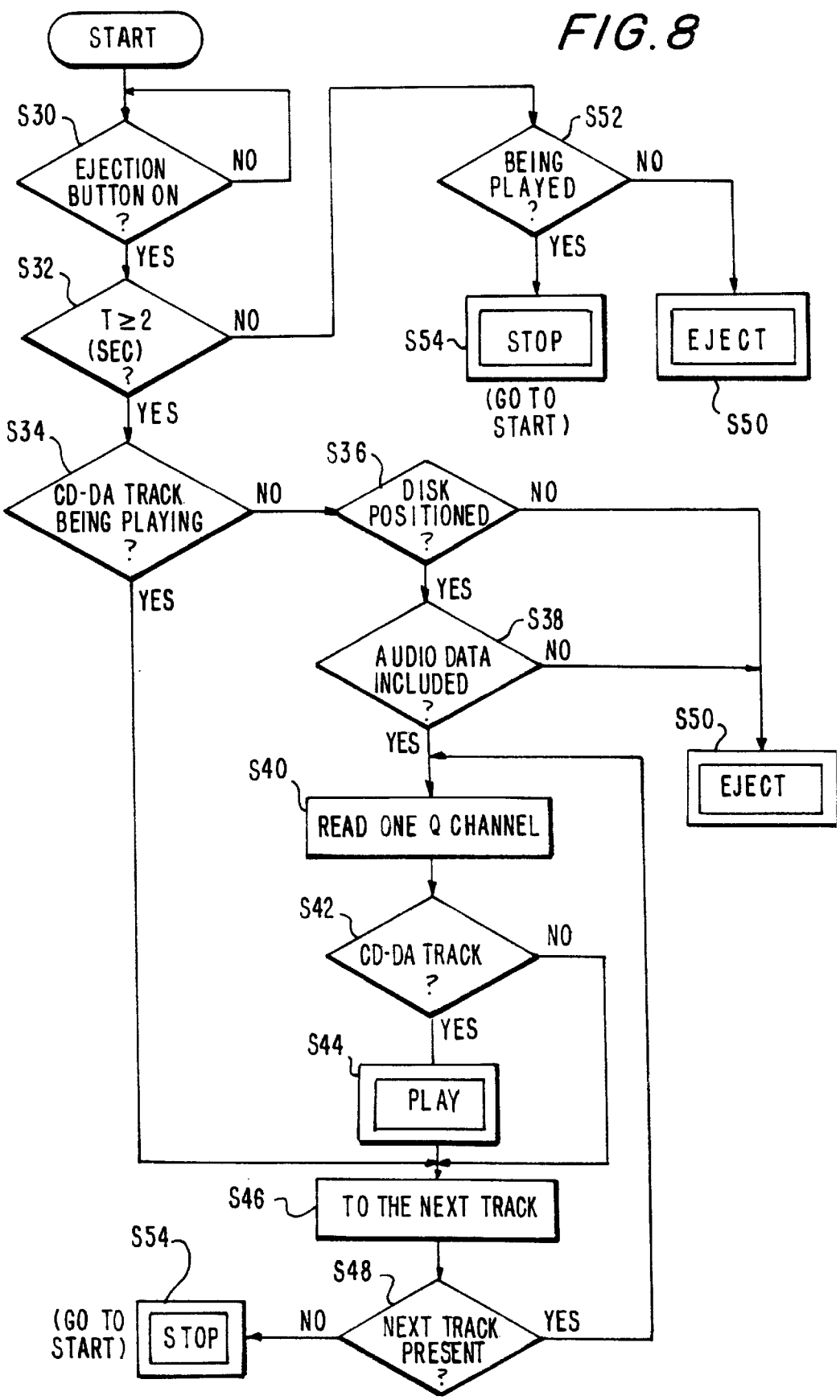
FIG. 8 is a flowchart of the operation when the ejection button of the CD-ROM drive is depressed.

It would be easily inferred that steps S44, S50, and S54, which are enclosed by double lines in FIG. 8, correspond respectively to (PLAY (play start)], [EJECT], and (STOP (play halt)] buttons.

In short, through the processing in the flowchart: in FIG. 8, the controller or command mechanism 66 monitors the depression of the ejection button 6, and the combination of the manipulation of the ejection button 6 and the operational state of the CD-ROM drive 50 accomplishes the individual operations relative to a music CD. It should be fully understood that this processing is the core of the concept of the present invention. It should also be fully understood that terms "play" and "replay" in this specification indicate that audio data in a CD-DA track on the loaded disk are read, converted into analog data by the DA converter 60, and outputted without any change. Further, it should be noted that the bus connector 51 (i.e., the bus 8 of the computer 1) is not used for the operation of a music CD.

In this embodiment, only a CD-DA track is employed for replaying. However, it would be obvious that, so long as audio data that are interleaved and recorded can be decoded inside the CD-ROM drive, the concept of the present invention can be applied for a track conforming to CD-I format or CD-ROM XA format.

The present invention has been described in detail while referring to the specific illustrated embodiment. However, it should be obvious for one having ordinary skill in the art that various modifications or revisions of the embodiment are possible within the scope of the present invention. For example, while a notebook computer is employed for the explanation of the embodiment of the present invention, a CD replay device according to the present invention can also be employed with other types of portable information processing apparatus (such as word processors or other OA devices). That is, although the present invention has been disclosed by using an example, it should not be limited to that example. To understand the subject of the present invention, the following claims should be referred to.

As described above in detail, according to the present invention, it is possible to provide a CD replay device that can be incorporated in a notebook computer and that can easily replay a music CD without interrupting an application, which is being executed by a computer system, and to a method for controlling such a CD replay device.

An ejection button itself is one of the standard features for an incorporated CD-ROM drive, as is shown in FIG. 1, and thus does not increase the manufacturing costs. Since the operations as shown in FIG. 9 can be performed inside the CD-ROM drive by firmware, the design of a notebook computer system is not affected at all.

The basic operations, such as the beginning of the replaying of a music CD, the halting of the replaying, and the head seek-and-set process for the next piece of music, can be performed without requiring the control of a computer system, and the computer system does not have to terminate the application that is being executed. Therefore, when a user desires to relax by listening to music, the gratification of the desire can be obtained simply by depressing the ejection button, so that "working while listening to music" is a concept that can be easily realized, depending on the mood of the moment.

Further, since it is not necessary for an application for operating a music CD and a device driver for a CD-ROM drive to be resident in the main memory of a computer system, system resources can be saved.

What is claimed is:

1. A personal computer having a CPU, an integrated CD player and a CD replay device with the CD player device being adapted to read data from a surface of a CD disk mounted in the CD player and being ejectable therefrom without interrupting an application program being executed by the computer and wherein the CD replay device comprises:

a single control means for controlling the reading of data from said CD and for controlling the ejection of said CD from said replay device when said control means is operated; and means for timing the period during which said control means is operated whereby said CD is ejected from said replay device when said control means is operated for a time period less than a predetermined time period and said replay device reads data from the surface of said CD when said control means is operated for a time period equal to or longer than said predetermined time period.

2. A computer having a CD replay device as claimed in claim 1, wherein said surface of said CD disk has a plurality of tracks thereon and the reading of data from said surface of said CD disk is halted when said control means has been operated for a time period less than said predetermined time period during the reading of a track on said surface and the reading of said surface begins on a different track when said control means has been operated for a time period equal to or longer than said predetermined time period.

3. A device as claimed in claim 2, wherein said control means is an ejection button and is operated when said button is depressed.

4. A device as claimed in claim 3, wherein said control means is an ejection button and is operated when said button is depressed.

5. A method for operating a personal computer having a CD player and a CD replay device integrated therein such that the CD replay device reads data from a CD mounted in the CD player without interrupting an application program being executed by the computer, said CD replay device including a single control member for controlling the ejection of said CD, with said CD having a plurality of tracks, said method comprising the steps of:

halting the replaying of said CD when said control member has been depressed for a period of time that is less than a predetermined time during the replaying of said CD; and beginning the replaying of the next track on said CD when said control member has been depressed for said predetermined time during the replaying of said CD.

6. A method as claimed in claim 5, wherein said control member is an ejection button which is operated by depressing the button.

7. A method for operating a personal computer having a CPU, a computer system with a main memory, a CD player and a CD replay device integrated into said personal computer through a common bus such that the CD replay device reads data from a CD mounted in the CD player without interrupting an application program being executed by the computer with said CD replay device comprising:

a tray on which a CD player is placed, a discharge mechanism for inserting and ejecting said CD from said tray, an ejection button to control the ejection of said tray, a read mechanism for seeking data on a surface of said CD and for reading said data, a data processor for processing data, a line out terminal for relaying an analog output of said data, an interface for connecting said CD replay device to said bus and a controller for controlling all the operations, said methods comprising the steps of:

initiating the operation of said discharge mechanism for discharging said CD when said ejection button is depressed for a period that is shorter than a predetermined time while said read mechanism is halted;
beginning data reading by said read mechanism when said ejection button is depressed for said predetermined time; and
outputting the data read from said line out terminal.

8. A method as defined in claim 6 further comprising:
skipping the track position on said CD to a succeeding track when said ejection button is depressed for said predetermined time period and said data is being read by said read mechanism.

9. A method for operating a personal computer having a CPU, a computer system with a main memory, a CD player and CD replay device integrated in said personal computer through a common bus such that the CD replay device reads data from a CD mounted in the CD player without interrupting an application program being executed by the computer, said CD replay device comprising a tray on which a CD having a plurality of tracks is placed, a discharge mechanism for inserting and ejecting said tray, an ejection button to control the ejection of said tray, a read mechanism for seeking data on a surface of said CD and for reading said data, a data processor for processing data, a line out terminal for relaying an analog output of said data that are read, an interface for connecting said CD replay device to said bus, and a controller for controlling all the operations, wherein data is read from a CD-DA track and an analog output of said data can be transmitted from said line out of terminal, said method comprising the steps of:

a timing step of timing a period during which said ejection button is depressed;
a first decision step of determining whether or not a CD-DA track is being read when, at said timing step, said period is of a predetermined period;
a second decision step of determining whether or not a CD has been placed on said tray when, at said first decision step, no reading of CD-DA track is being performed;
a third decision step of determining whether or not a CD-DA track is included on said CD when, at said second decision step, said CD is determined to be placed on said tray;
a seeking step of seeking the next CD-DA track when, at said third decision step, it is determined that CD-DA track is included on said CD; and
a playing step of read data from the CD-DA track that is found at said seeking step and of providing at said line out terminal an analog output of said data that is read.

10. A method for controlling a CD replay device according to claim 9, wherein when the data reading from the CD-DA track has been completed at said playing step, a following CD-DA track is sought on said CD and said playing step is repeated.

11. A method for controlling a CD replay device according to claim 10, wherein, when the result obtained by one of said second and said third decision steps is negative, said tray is ejected by said discharge mechanism.

12. A method for controlling a CD replay device according to claim 9, wherein when data are being read from said CD-DA track at said first decision step, a following CD-DA track on said CD is sought and data may be read from said CD-DA track.

13. A method for controlling a CD replay device according to claim 9, wherein, when a period during which said ejection button is depressed is less than a predetermined time at said timing step, a check is performed to determine whether or not data are being read from a CD-DA track, and when data are being read, said data reading is halted.

14. A method for controlling a CD replay device according to claim 9, wherein, when a period during which said ejection button is depressed is less then a predetermined time at said timing step, a check is performed to determine whether or not data are being read from a CD-DA track, and when data reading is not being performed, said tray is ejected by said discharge mechanism.

* * * * *